[12] United States Patent  
Döbelin

(10) Patent No.: US 11,480,551 B2  
(45) Date of Patent: Oct. 25, 2022

(54) SAMPLE INJECTOR AND SAMPLING METHOD, IN PARTICULAR FOR LIQUID CHROMATOGRAPHY

(71) Applicant: Prolab Instruments GmbH, Reinach BL (CH)

(72) Inventor: Werner Döbelin, Reinach BL (CH)

(73) Assignee: Prolab Instruments GmbH, Zürich (CH)

( * ) Notice: Subject to any disclaimer, the term of this patent is extended or adjusted under 35 U.S.C. 154(b) by 98 days.

(21) Appl. No.: 16/644,590

(22) PCT Filed: Sep. 6, 2018

(86) PCT No.: PCT/EP2018/074055  
§ 371 (c)(1),  
(2) Date: Mar. 5, 2020

(87) PCT Pub. No.: WO2019/048570  
PCT Pub. Date: Mar. 14, 2019

(65) Prior Publication Data  
US 2021/0063360 A1 Mar. 4, 2021

(30) Foreign Application Priority Data  
Sep. 6, 2017 (CH) .................................... 01111/17

(51) Int. Cl.  
*G01N 30/20* (2006.01)  
*G01N 30/32* (2006.01)  
*G01N 30/02* (2006.01)

(52) U.S. Cl.  
CPC ............. *G01N 30/20* (2013.01); *G01N 30/32* (2013.01); *G01N 2030/027* (2013.01); *G01N 2030/201* (2013.01); *G01N 2030/202* (2013.01)

(58) Field of Classification Search  
CPC .. G01N 30/20; G01N 30/32; G01N 2030/027; G01N 2030/201;  
(Continued)

(56) References Cited

U.S. PATENT DOCUMENTS  
4,153,076 A 5/1979 McNeil et al.  
2008/0302393 A1* 12/2008 Jafari ................. G01N 35/1004  
134/22.11  
(Continued)

FOREIGN PATENT DOCUMENTS  
EP 0884575 12/1998  
EP 1795264 6/2007  
(Continued)

OTHER PUBLICATIONS

International Search Report dated Feb. 1, 2019 from corresponding International Patent Application No. PCT/EP2018/074055.  
(Continued)

*Primary Examiner* — Robert R Raevis  
(74) *Attorney, Agent, or Firm* — Stradley Ronon Stevens & Young, LP

(57) ABSTRACT

A sample delivery system for liquid chromatography is provided. The sample delivery system includes: a sample receptacle; a sample aspiration cannula for aspirating a sample located in the sample receptacle, the sample aspiration cannula being directed using a drive in a direction towards the sample receptacle so that a tip at a distal end of the sample aspiration cannula is immersed in the sample; and a guide element for the sample aspiration cannula provided above the sample receptacle, the guide element being designed as a washing device. The sample aspiration cannula can be retracted using the drive at least so far from the sample receptacle such that the distal end of the sample aspiration cannula may be cleaned in the washing device.

11 Claims, 2 Drawing Sheets

(58) Field of Classification Search
CPC .............. G01N 2030/202; G01N 30/18; G01N 2030/185; G01N 30/16; G01N 35/1004; G01N 2035/1006; G01N 35/1095
USPC ....... 73/61.55, 61.59, 64.56, 864.21, 864.22, 73/864.23, 864.24, 864, 25
See application file for complete search history.

(56) References Cited

U.S. PATENT DOCUMENTS

| | | | |
|---|---|---|---|
| 2011/0189713 A1* | 8/2011 | Le Comte | G01N 1/38 435/29 |
| 2016/0041072 A1* | 2/2016 | Yotani | G01N 33/491 73/861.41 |
| 2016/0274003 A1 | 9/2016 | Doebelin et al. | |
| 2017/0241886 A1* | 8/2017 | Harris | G01N 1/10 |
| 2021/0025910 A1* | 1/2021 | Hofmann | G01N 35/1065 |

FOREIGN PATENT DOCUMENTS

| | | |
|---|---|---|
| EP | 2594945 | 5/2013 |
| EP | 2980580 | 2/2016 |
| GB | 2075672 | 11/1981 |
| WO | 9701750 | 1/1997 |

OTHER PUBLICATIONS

Swiss Search Report dated Aug. 13, 2018 from corresponding Swiss Patent Application No. 01111/17.

* cited by examiner

SAMPLE INJECTOR AND SAMPLING METHOD, IN PARTICULAR FOR LIQUID CHROMATOGRAPHY

CROSS REFERENCE TO RELATED APPLICATIONS

This application is a U.S. national phase filing of International Patent Application Number PCT/EP2018/074055 filed Sep. 6, 2018 that claims the priority of Swiss Patent Application Number 01111/17 filed Sep. 6, 2017. The disclosures of these applications are hereby incorporated by reference in their entirety.

FIELD

The invention relates to the field of sample delivery devices and sampling, in particular for liquid chromatography.

BACKGROUND

With conventional liquid chromatography samplers, especially with HPLC/UHPLC samplers for (Ultra) High-Performance Liquid Chromatography, great efforts are made to inject sample quantities that are as accurate as possible, especially those that are precisely measured, with low carry-over. As a rule, this should also be possible with relatively small sample quantities down to a few, especially 1 to 10, microliters or fractions of, especially 0.1 to 0.8, microliters. The main problem is that in combined liquid chromatography/mass spectroscopy (LCMS) systems, due to the large quantitative measuring range, even small carry-overs of sample material from an injection that has already been carried out cause measuring errors in subsequent injections. In order to counteract this, complex and time-consuming washing procedures are applied and inert materials are used wherever possible. With more and more measuring methods, the sample delivery cycle time from injection to injection and the still existing residual carry-over becomes the limiting factor.

SUMMARY

According to an exemplary embodiment of the invention, a sample delivery system for liquid chromatography is provided. The sample delivery system includes: a sample receptacle; a sample aspiration cannula for aspirating a sample located in the sample receptacle, the sample aspiration cannula being directed using a drive in a direction towards the sample receptacle so that a tip at a distal end of the sample aspiration cannula is immersed in the sample; and a guide element for the sample aspiration cannula provided above the sample receptacle, the guide element being designed as a washing device. The sample aspiration cannula can be retracted using the drive at least so far from the sample receptacle such that the distal end of the sample aspiration cannula may be cleaned in the washing device.

According to another exemplary embodiment of the invention, a method of retrieving a liquid sample from a sample vessel using a sample delivery system is provided. The method includes the steps of: (a) lowering a sample aspiration cannula into the liquid sample so that a distal end of the sample aspiration cannula is immersed in the liquid sample so that an aspiration opening is positioned below a liquid level of the liquid sample; (b) aspirating at least part of the liquid sample into and/or through the sample aspiration cannula; (c) lifting the sample aspiration cannula; (d) cleaning an outside of the sample aspiration cannula using a washing solvent, wherein the cleaning is carried out during the lifting step. An entirety of the distal end is wetted, preferably flowed around, by the washing solvent.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures:

FIG. 4 illustrates an exemplary injection unit in a sample receiving position in accordance with an exemplary embodiment of the invention.

DETAILED DESCRIPTION

Figure 1:
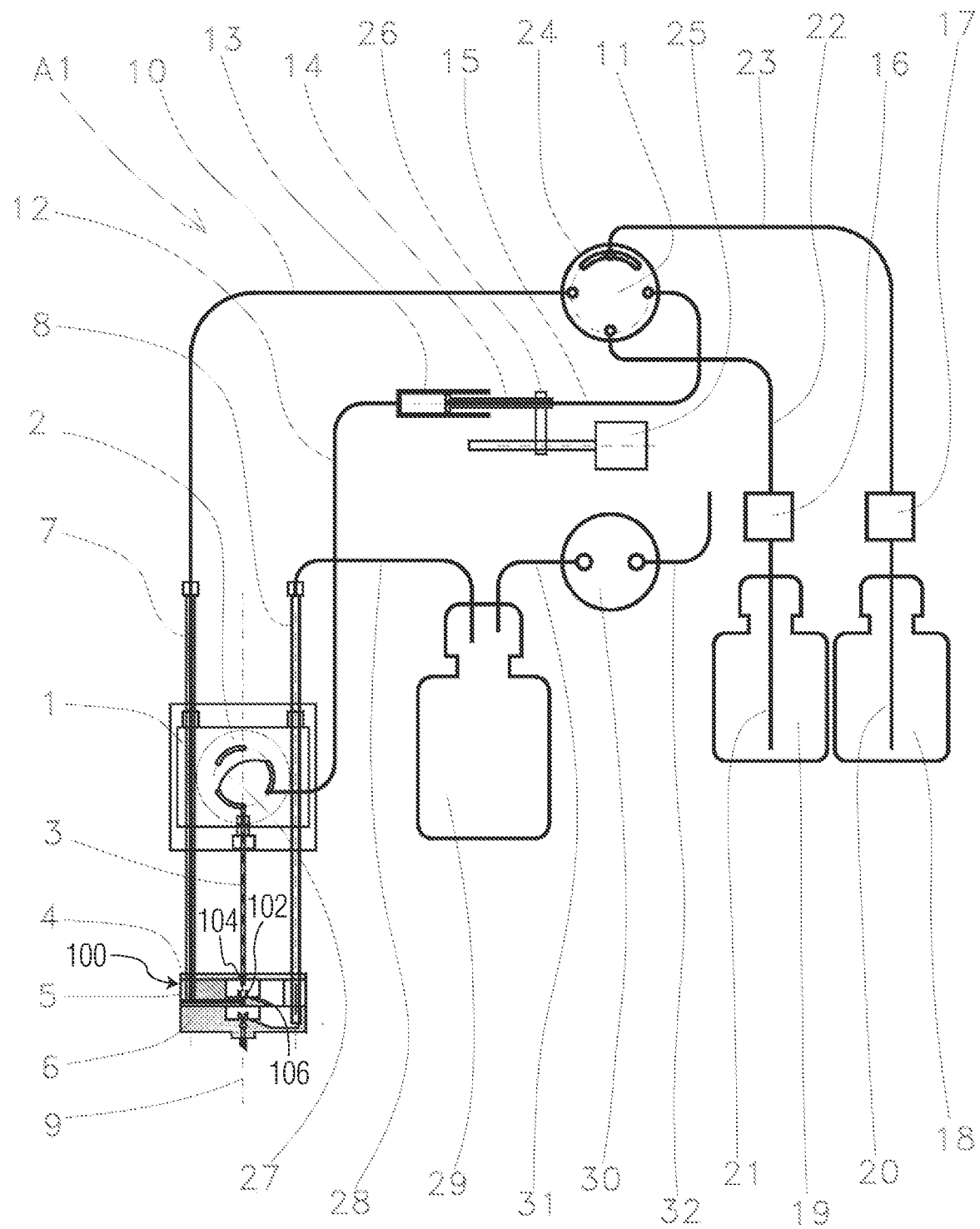
FIG. 1 illustrates an exemplary design of a sample delivery system in accordance with an exemplary embodiment of the invention.

The invention relates to the field of sample delivery devices and sampling, in particular for liquid chromatography. It concerns a sample delivery system with specific cleaning device and a method for taking a liquid sample from a sample vessel. Such a sampling system and method shall be able to inject an exact amount of a sample and also ensure that the surfaces in the conduits contaminated with sample material from the sample may be cleaned quickly and efficiently before the next sample is aspirated for analysis by liquid chromatography.

Aspects of the invention relate to a sample delivery system (A1) with a specific cleaning device for liquid chromatography (LC), in particular for LCMS and MS systems. It is provided with an injection valve unit (1) with injection valve (2) which is rigidly and firmly connected to a rigid sample aspiration cannula (3). It shows one or more drives by means of which the injection valve (2) and the sample aspiration cannula (3) can be directed towards the sample, and a guide (4, 5, 6) for the sample aspiration cannula (3), which serves as a washing chamber for the sample aspiration cannula (3). This makes it possible to move the injection valve unit (1) with injection valve (2) and sample aspiration cannula (3) in an efficient and safe manner so that a sample to be examined can be retrieved from a sample vessel (35) and, in addition, reliable cleaning of a potentially contaminated outside of the sample aspiration cannula (3) is made possible, as according to the invention, the guide (4, 5, 6) of the sample aspiration cannula (3), which prevents an undesired deviation from the desired position during the movement of the sample aspiration cannula (3), also forms a washing chamber. The sample aspiration cannula (3) is moved through this, whereby the washing solvent can have a cleaning effect on the outside of the sample aspiration cannula (3).

In accordance with aspects of the invention, the cleaning of the sample aspiration cannula (3) is very efficient, both from the inside and the outside, which considerably reduces the risk of carry-over or contamination of a sample. Sampling can also be at least partially automated and the time required for this can be reduced.

The invention is therefore based on the task of providing a sample delivery system and a process preparation which shows a particularly low degree of carry-over and ideally allows the taking and/or exact dosing of relatively small sample quantities.

According to aspects of the invention, this task is solved with a sample delivery system for liquid chromatography, in particular for LCMS or MS systems, and with a method for taking a liquid sample from a sample vessel according to the independent patent claims.

Advantageous exemplary features of the invention are subject of the sub-claims and/or result from the following description in connection with the drawings.

A sample delivery system according to exemplary embodiments of the invention includes a sample receptacle; a sample aspiration cannula for aspirating a sample located in the sample receptacle, which sample aspiration cannula can be directed by means of a drive, in particular a first drive, in a direction, hereinafter referred to as "Z", towards the sample receptacle, so that a distal end, in particular a tip, of the sample aspiration cannula dips into the sample; and a guide element for the sample aspiration cannula provided above the sample receptacle, which guide element is designed as a washing device; wherein the sample aspiration cannula can be retracted by means of the drive at least far enough from the sample receptacle so that the distal end of the sample aspiration cannula can be cleaned in the washing device.

The sample receptacle is used for storing or stockpiling at least one, but usually a large number of different liquid samples, which are usually contained in separate containers, especially sample vessels, inserted into the sample receptacle, and can be moved in one or two directions perpendicular to the Z-direction.

For removal or in order to aspirate a sample, the sample aspirating cannula is driven so far in the direction of the sample intake, usually downwards, and in particular parallel to a cannula axis, which can correspond to a longitudinal axis of at least a part of the sample aspirating cannula extending in a longitudinal direction by means of the drive that the distal end of the sample aspirating cannula together with an aspiration opening formed at or in the vicinity thereof is submerged into the sample, whereupon at least a part of the sample is aspirated into and/or through the sample aspirating cannula. The sample aspiration cannula is then retracted, usually raised.

The guide element, in particular a first guide channel formed as part of the guide element and preferably extending parallel to the longitudinal axis of the sample aspiration cannula, ensures a defined movement of the sample aspiration cannula when it is moved and at least largely prevents it from bending in an undesirable manner.

The fact that the guide element is designed as a washing device means that an outer side of the sample aspiration cannula can already be cleaned while the sample aspiration cannula is retracted, in particular raised. This can prevent sample material from drying on the outer side. This, in turn, allows particularly efficient cleaning of the sample aspiration cannula even with reduced use of washing solvent, thus reducing or even minimizing carryover.

The sample aspiration cannula can be retracted or raised by means of the drive at least so far from the sample receptacle that the distal end of the sample aspiration cannula can be cleaned in the washing device, the distal end coming to lie in particular in the region of the guide element designed as a washing device, and preferably together with the sample aspiration cannula can be moved even further back or upwards, in particular can be completely moved out of or withdrawn from the first guide channel.

In order to allow for most effective cleaning of the outside of the sample aspiration cannula, a retention volume and a supply conduit for a washing solvent are provided as part of the washing device. The retention volume can open into the first guide channel, which is preferably at least partially closable by the sample aspiration cannula if it extends into or through the first guide channel. Preferably an outside diameter of the sample aspiration cannula is smaller, in particular 5% to 80%, preferably 10% to 50%, smaller than an inside diameter of the first guide channel, so that a flow of washing solvent through the first guide channel is largely, but not completely, prevented. The retention volume may in particular be formed by a cup-shaped section of the guide element, and/or may be delimited at the top by an overflow, which may in particular be formed by a lowest point on an upper edge of the cup-shaped section. The cup-shaped section may in particular, at least section-wise, be at least approximately cylindrical, conical or hemispherical; taper towards the first guide channel; have a maximum internal diameter corresponding to 1.5 to 25 times, preferably 2 to 10 times, the external diameter of the sample aspiration cannula; and/or be open at its top.

The guide element can be designed as part of a washing chamber which is formed by or in a guide or guide unit for the sample aspiration cannula, and which washing chamber includes an inlet opening and an outlet opening for the sample aspiration cannula, which are formed in particular in a floor or an upper wall, top side, roof, lid or cover of the washing chamber, and which each form a guide channel for the sample aspiration cannula, which in particular runs coaxially with the longitudinal axis of the sample aspiration cannula.

The guide element, in particular the first guide channel, can form the outlet opening for the sample aspiration cannula. However, the guide element designed as a washing device with the first guide channel can also be provided in an interior of the washing chamber, wherein the inlet opening and the outlet opening for the sample aspiration cannula form a second and third guide channel for the sample aspiration cannula, respectively. In particular, the washing chamber may include a first cavity and a second cavity, which are preferably connected to each other exclusively via the guide element, in particular the first guide channel.

The inlet and/or outlet opening may be at least partially closable by the sample aspiration cannula if it protrudes into or through the corresponding opening. Herein, the outer diameter of the sample aspiration cannula is preferably smaller, in particular 5% to 80%, preferably 10% to 50%, smaller than an inner diameter of the inlet and/or outlet opening, so that a flow of washing solvent through the inlet and/or outlet opening is largely, but not completely, prevented.

The washing chamber preferably includes a drain for the washing solvent, wherein the sample delivery system may further include a suction device or pump by means of which washing solvent can be sucked or pumped out of the washing chamber. The washing chamber can be hermetically sealed except for the inlet and outlet openings as well as the supply conduit and drain.

The guide element, the washing chamber and/or the washing device may be designed to be movable, in particular independently of the sample aspiration cannula, in the direction towards and away from the sample receptacle, for which purpose in particular a second drive may be provided. This allows the washing device or the washing chamber to be brought as close as possible to the sample receptacle or a sample vessel retained in it, which means that the outside of the sample aspiration cannula can be cleaned particularly effectively and drying of sample material can be prevented particularly effectively.

Due to the fact that in particular the inlet opening, the first outlet opening and/or the first guide channel are designed with a larger inner diameter than the outer diameter of the sample aspiration cannula, the corresponding openings or channels can be partially but not completely closed, in particular not sealed, by the sample aspiration cannula. This prevents the corresponding openings or channels from being contaminated by sample material, which further significantly reduces carry-over.

The washing chamber may have a first cavity 33 and a second cavity 34, generally located above the first cavity 33, which are preferably connected to each other exclusively by the first guide element—in this case provided inside the washing chamber—in particular the first guide channel, and wherein the retention volume is formed in the second cavity. This can prevent dripping or flowing of washing solvent out of the outlet opening, especially in combination with a suction or pumping of washing solvent out of the washing chamber as described below. In particular, the drain can be led out of the first cavity and the supply conduit can open into the second cavity. In combination with a suction or pumping of washing solvent from the washing chamber through the drain, a particularly effective cleaning of the outside of the sample aspiration cannula can be achieved by this design, because washing solvent is sucked from the retention volume through the first guide element into the second cavity, and thereby flows around the outside of the sample aspiration cannula at a, generally increased, speed, which can be influenced in particular by a delivery rate of the suction or pumping and/or a choice of the different inner and/or outer diameters.

A sample delivery system for liquid chromatography (LC) according to exemplary embodiments of the invention, in particular for LCMS and MS systems with an injection valve unit, may include an injection valve which is preferably firmly connected to a preferably rigid sample aspiration cannula, one or more drives by means of which the injection valve and the sample aspiration cannula can be directed in the direction of the sample, and a guide for the sample aspiration cannula which serves as a washing chamber for the sample aspiration cannula. This allows for the injection valve unit with injection valve and sample aspiration cannula to be moved in an efficient and safe manner so that a sample to be examined can be retrieved from a sample vessel and, in addition, for reliable cleaning of a potentially contaminated outside of the sample aspiration cannula, because, according to the invention, the guide for the cannula, which prevents an undesired deviation from the desired position during the movement of the sample aspiration cannula, at the same time forms a washing chamber through which the sample aspiration cannula is moved and thus the washing solvent can act upon the outside of the sample aspiration cannula.

In a particularly advantageous exemplary sample delivery system, the guide, designed as a washing chamber, can be designed in such a way that washing solvents can be pumped into it and at the same time sucked or pumped off. This ensures a very effective flow of washing solvent, which is characterized by a particular cleaning effect. It is also possible to achieve a higher flow velocity and also a shorter purification time and thus shorter operating time for the chromatograph, especially the liquid gas chromatograph.

In a further advantageous exemplary sample delivery system, the guide designed as a washing chamber, in particular the guide element 102, may be designed in such a way that it has a cup-shaped section 104 with a larger diameter than the sample aspiration cannula, through which the sample aspiration cannula is guided and which can be acted upon by washing solvent, the cup-shaped section 104 in particular being capable of defining or forming at least part of the retention volume. The washing solvent introduced into the section can be collected in the section until overflow occurs, in particular when the first guide channel 106 is at least partially closed by the sample aspiration cannula at least partially, and allows for safe cleaning of the outer surfaces of the sample aspiration cannula passed through, even when only small amounts of washing solvent have been introduced. This allows for effective cleaning of the outside of the sample aspiration cannula without an additional cleaning step, so that the sample delivery cycle time is not unnecessarily extended. At the same time, the area of surfaces contaminated with sample or sample material is kept as small as possible and the amount of washing solvent required is kept small.

Preferably, the injection valve of the sample delivery system can be firmly connected to a sample aspiration cannula to form a rigid unit, which can be moved, in particular, by a common drive. In this way, a simple and at the same time safe handling of the sample delivery system according to the invention is guaranteed. In addition, the drive may be very compactly designed, which makes it possible to use it in a variety of chromatographs, especially liquid gas chromatographs, especially with mass spectroscopy coupling.

In a preferred design of an exemplary sample delivery system, one or more guide rods of the sample aspiration cannula can be designed as washing solvent supply conduit and/or washing solvent suction channel. The guide rods of the sample aspiration cannula ensure a defined movement of the sample aspiration cannula as well as the injection valve unit with injection valve from and to the sample vessel, whereby the sample can be retrieved very reliably and quickly. Within the scope of this movement, the sample aspiration cannula is cleaned in accordance with the invention. The use of one or more guide rods saves space by eliminating additional conduits and simplifies the design of the sample delivery system, making it safer to handle.

In the sample delivery system according to certain exemplary embodiments of the invention, a dilutor can be provided which includes a hollow piston through which washing solvent can selectively be supplied, in particular from behind, by means of a valve and pump and pumped, in particular in the direction of the sample aspiration cannula. In addition, it is also possible to use the dilutor to draw a sample from a sample vessel or to convey the aspirated sample for analysis in the liquid gas chromatograph. For this purpose, a separate valve may be provided in or on the hollow piston to prevent mixing of the sample and the washing solvent, in particular by the latter continuing to run or drip.

The dilutor may be used in such a way that, when the injection valve unit is in the rest position (upper end position), it conveys the washing solvent from behind through the injection valve and the sample aspiration cannula, thereby cleaning the latter from the inside, while in the aspiration position (lower end position) the sample is aspirated from a sample vessel via the sample aspiration cannula and the injection valve or conveyed to the liquid gas chromatograph for analysis, respectively, or, respectively, in the intermediate positions between the upper and lower end positions, the washing solvent is conveyed via the guide rods to and from the guide, which is designed as a washing chamber, thus allowing for the sample aspiration cannula to be cleaned from the outside.

In the rest position (upper end position), the washing solvent supplied via the sample aspiration cannula, which collects in the washing chamber, can be sucked from the washing chamber, in particular by the suction channel guide rod. In the aspiration position (lower end position), the sample can be aspirated in through the sample aspiration cannula while no washing solvent is used for cleaning, thus largely eliminating contamination by washing solvent. In intermediate positions, in particular positions between the rest position and the aspiration position, the washing solvent supplied via the guide rod for the supply of the washing solvent, which collects in the washing chamber and cleans the outside of the sample aspiration cannula moved through the washing chamber, can be sucked out of the washing chamber, in particular by the suction channel guide rod, especially at simultaneously.

These separate process steps are additionally controlled by the selector valve in conjunction with the injection valve in such a way that the correct substances, in particular washing solvents or the sample, are present at the dilutor or the guide rods. Preferably, the various process steps mentioned are separated from each other in such a way that either cleaning from the outside or cleaning from the inside or retrieving or further transport of the sample occurs, thus preventing a mixed state.

In this way, in addition to reducing the risk of carry-over or contamination, the duration of an injection cycle is noticeably shortened and the handling of the sample delivery system is simplified. In addition, the washing solvent can be dosed as required during the measurements, which results in a very flexible and safe handling, as the dosage of the washing solvent can be adjusted exactly to the type of sample and its property to adhere to the sample aspiration cannula. Due to this design of the sample delivery system, the length of the injection cycle time can also be very short.

In a preferred design of the sample delivery system according to certain exemplary embodiments of the invention, the sample aspiration cannula can be made of titanium. Due to the brittle material properties of titanium, its use in conventional sampler deliverers does not make sense with the current state of the art, since titanium cannulas can break very easily, especially when bent, for example during assembly, maintenance or cleaning. By the described, special type of rigid connection of the sample aspiration cannula with the injection valve unit in accordance with the invention, and the cleaning on the inside and outside of the sample aspiration cannula with the defined and the rigid structure of injection valve unit with injection valve and sample aspiration cannula, which are jointly guided safely during the cleaning process, prevention of bending and torsion of the sample aspiration cannula is achieved in accordance with the invention. According to the invention, sample aspiration cannula made of titanium can be used and connected directly to the chromatograph, in particular liquid gas chromatograph, so that on the one hand the surfaces possibly contaminated with sample material can be kept small and on the other hand the sample aspiration cannula is largely protected against corrosion by the samples or by the washing solvent by using titanium. In addition, the inert behavior of titanium largely prevents sample material or washing solvent from adhering to a titanium cannula, which greatly simplifies the cleaning of the cannula. This design of the cannula thus provides a durable and robust sample aspiration cannula which, on the one hand, can be connected directly to the chromatograph, especially liquid gas chromatographs, and, on the other hand, can be cleaned particularly easily.

In an advantageous exemplary sample delivery system, the guide of the sample aspiration cannula may include a transverse hole in the lower area. This is a simple and effective way to prevent the possible negative pressure that could be created by cleaning the outside of the sample aspiration cannula by rinsing it with washing solvent simultaneously with the cannula being withdrawn from the sample, thus reducing the risk of damage.

Advantageously, the guide of the sample aspiration cannula in the sample delivery system according to the invention can have a penetration device, in particular a pre-penetration extension, in the lower area of the guide, in particular on the underside of the lower part of the guide, through which the sample aspiration cannula can emerge and can penetrate a closure cap of the sample vessel in order to subsequently retrieve a sample with the sample aspiration cannula without any strain from the piercing and to supply it for liquid chromatographic analysis. This ensures a particularly safe and poor-in-error handling of the sample delivery system. The penetration device may be formed as part of or adjacent to, in particular below, the outlet opening, for example in the form of a hollow cylinder which may be bevelled and/or sharpened at an angle at an end remote from the washing chamber to facilitate or ensure safe penetration of the closure cap when the guide is moved sufficiently far into the direction of the sample receptacle.

A combination of the penetration device and the first guide element allows the use of a flexible sample aspiration cannula 3, in particular made of plastic or in the form of a flexible capillary made of quartz glass ("fused silica"), which can be coated with plastic, in particular polyimide. The use of a flexible sample aspiration cannula 3 allows a simpler design of the sample deliverer and shorter sampling cycles, since, especially in comparison with rigid sample aspiration cannulas, reduced positioning accuracy of the first drive may be employed. In particular, if the entire sample is to be retrieved from the sample vessel, a rigid sample aspiration cannula must be placed exactly with its tip on the bottom of the sample vessel to avoid damage; however, this will at least partially, in the worst case even largely, close an aspiration opening formed at the distal end, in particular the tip of the sample aspiration cannula.

The advanced developments of the invention allow for a very low carry-over and thus a very low disturbance of the chromatographic measurements by contamination with a short injection cycle time. The surfaces and areas of the sample delivery system contaminated with sample are kept as small as possible and preferably as inert as possible. This allows the washing procedures to be carried out quickly and efficiently and the loading function of the samples by the sample delivery system to be carried out quickly and accurately.

These effects of the advanced developments are achieved by the fact that the sample aspiration cannula is directly connected to the HPLC/UHPLC injection valve without an intermediate conduit, in particular rigidly, that the sample aspiration cannula can be made of titanium, that the injection valve is directed together with the sample aspiration cannula as a single entity to the sample for sample collection, that the cannula guide is designed as a specific cavity as a washing chamber for the sample aspiration cannula, which has a washing solvent inlet and a washing solvent drain. Herein, the washing solvent drain is connected to a vacuum pump and a collecting vessel so that the supplied washing solvent can be sucked into the collecting vessel via the drain and the washing solvent is pumped by means of pumps through a selector valve through the hollow piston of the dilutor syringe and subsequently through the injection valve and subsequently through the sample aspiration cannula or through the washing solvent inlet into the cannula guide, that the rotor of the selector valve can be positioned in such a way that all connections are closed and a sample can therefore be aspirated by means of the dilutor, so that while the cannula is being withdrawn from the sample, the outside of the cannula can be washed in the cannula guide at the same time. In doing so, the cannula guide is moved to the injection valve in alignment with the cannula. The guide rods for the cannula guide serve as inlet and drain conduits for the washing solvents. In addition, a transverse hole in the lower area of the cannula guide prevents a negative pressure from building up in the sample vessel.

In the following, a preferred exemplary embodiment of the invention is described using the enclosed drawings.

FIG. 1 shows an exemplary construction of a sample delivery system A1 according to the invention with the injection unit 1B (see FIGS. 2-4), with injection valve 2 directly screwed and thus rigidly connected to sample aspiration cannula 3.

The sample aspiration cannula 3 includes a multi-part cannula guide unit including the guide cover 4, the middle guide part 5 and the lower guide part 6, the guide rod 7 for supplying the washing solvent—also called washing solvent supply guide rod 7—and the suction channel guide rod 8, whereby guide cover 4, middle guide part 5 and lower guide part 6 can form an actual guide 100 for the sample aspiration cannula 3. The suction channel guide rod 8 can be moved along the cannula axis 9 in relation to the injection valve unit 1, overcoming its own weight and a slight spring force. The displacement enables the sample aspiration cannula 3 to be inserted into a sample vessel 35 to retrieve the sample to be examined and conveyed by the sample delivery system A1. After removal, the injection valve unit 1 is moved back along the cannula axis 9 guided by the guide rod 7 for washing solvent supply and the suction channel guide rod 8.

The guide rod 7 for the washing solvent supply is directly connected via the washing conduit 10 to the selector valve 11 for controlling the washing solvent. The conduit 12 also leads to the selector valve 11 via the dilutor syringe 13, via the dilutor syringe hollow piston 14 and conduit 15. Washing solvent pumps 16, 17 can be used to pump washing solvent from the bottles 18, 19 via the suction conduits 20, 21 and the connecting conduits 22, 23 to the selector valve 11.

The selector valve channel 24 can be positioned so that all selector valve connections are closed or there is a connection between adjacent selector valve connections. For this purpose, the selector valve channel 24 in selector valve 11 can be rotated by 360° in steps of 45°.

If the selector valve channel 24 to conduit 15 is in a closed position, the dilutor drive 25 can be used to move the dilutor syringe piston 14 via the dilutor drive adapter 26 and thus precisely defined quantities of washing solvent or sample can be aspirated in or discharged via the sample aspiration cannula 3. The valve position of the injection valve 2 determines whether the washing solvent or the sample is directed via the sample loop 27 or directly from conduit 12 to the sample aspiration cannula 3.

The suction channel guide rod 8 is connected to the suction conduit 28, which leads into the vacuum-proof waste bottle 29. With the aid of the vacuum pump 30 with the exhaust air conduit 32, a vacuum is generated via the vacuum conduit 31 and the suction channel guide rod 8 in the cavity 33, 34, which in particular comprises a first cavity 33 and a second cavity 34, which is shown in FIG. 2, with which washing solvent is sucked off if necessary.

Figure 3:
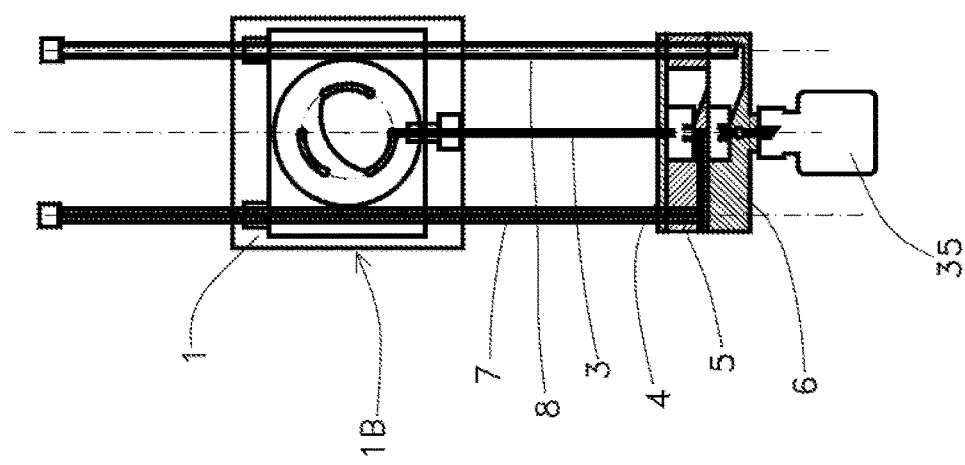
FIG. 3 illustrates an exemplary injection unit transition to the sample position in accordance with an exemplary embodiment of the invention.
Figure 2:
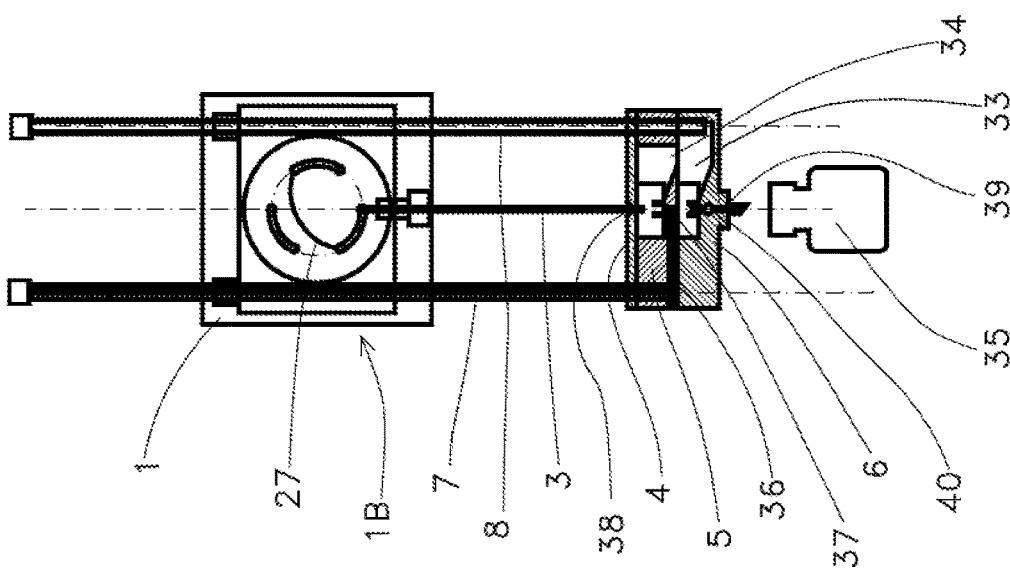
FIG. 2 illustrates an exemplary injection unit in parking position in accordance with an exemplary embodiment of the invention.

FIGS. 2, 3 and 4 show three different positions of injection valve unit 1 in injection unit 1B, where FIG. 2 shows the parking position of injection valve unit 1. FIG. 4 shows the position of injection valve unit 1 in the position of the sample receptacle, i.e. when the sample is retrieved from sample vessel 35 and conveyed to the liquid gas chromatograph for analysis. FIG. 3 shows the position of the injection valve unit 1 during the transition from the parking position to the position of the sample receptacle, in which comprehensive cleaning of the sample aspiration cannula 3 can be carried out.

The injection valve unit 1 with injection valve 2 and the directly screwed-on sample aspiration cannula 3 are connected to form a rigidly connected unit which can be moved relative to the multi-part cannula guide unit, including the guide cover 4, the middle guide part 5 and the lower guide part 6, the guide rod 7 for the supply of the washing solvent and the suction channel guide rod 8, which extend in the direction of a Z-axis, corresponding to the cannula axis 9, preferably in the vertical direction, in particular by means of a first drive.

As shown in FIG. 3, the multi-part cannula guide unit 4, 5, 6 can be placed on the sample vessel 35, in particular by means of a second drive, whereby the penetration device can penetrate a sealing cap of the sample vessel if necessary, and the sample aspiration cannula 3 can be inserted into the sample vessel 35 for sample collection by lowering the injection valve unit 1 along the Z-axis, i.e. along the cannula axis 9, as shown in FIG. 4.

With the dilutor unit including dilutor syringe 13, dilutor syringe hollow piston 14, dilutor drive adapter 26 and dilutor drive 25, the sample can be aspirated from the sample vessel 35 via the sample aspiration cannula 3 and the conduit 12 and shifted into the sample loop 27. By switching injection valve 2, the actual injection into the LCMS system takes place. After injection into the LCMS system, the sample aspiration cannula 3 is retracted by means of a displacement along the Z axis, i.e. along the cannula axis 9, moved by a drive, in particular the first drive. This is illustrated in FIG. 4, FIG. 3 and FIG. 2.

During retraction, the outside of the sample aspiration cannula 3 is washed in the middle guide part 5 with washing solvent. The washing solvent is pumped from bottles 18 or 19 via suction conduits 20 or 21 with the aid of washing solvent pumps 16 or 17 through connecting conduit 22 or 23 to selector valve 11. From the selector valve 11, the washing solvent passes through the selector valve channel 24, through the washing conduit 10 into the guide rod 7 for the washing solvent supply. It is then pumped through the wash channel 36 in the middle guide part 5 into the connection opening 37, through which the sample aspiration cannula 3 is withdrawn.

The connecting opening 37, which in particular forms the washing device with the first guide channel, exhibits a cup-shaped section with a larger diameter than the sample aspiration cannula 3. The sample aspiration cannula 3 is guided through the cup-shaped section, whereby it can be subjected to washing solvent in the cup-shaped section. The washing solvent introduced into the cup-shaped section is collected in the section until overflow occurs and allows for safe cleaning of the outer surfaces of the sample aspiration cannula 3 guided therethrough, even if only small amounts of washing solvent have been supplied.

The contaminated washing solvent is collected in the cavities 33, 34 of the washing chamber in the multi-part cannula guide unit 4, 5, 6 and sucked out of the lower cavity 33 via the suction channel guide rod 8, which forms the drain for the washing solvent, and the suction conduit 28 into the vacuum-proof waste bottle 29 with the aid of the vacuum pump 30. Air is also sucked in through the gap between the sample aspiration cannula 3 and the guide hole 38, which forms the inlet opening or the second guide channel as shown in FIG. 2, in the guide cover 4 and the gap between the sample aspiration cannula 3 and the guide hole 39 in the lower guide part 6, which may have a transverse hole 40, if the sample aspiration cannula 3 is still situated in the lower guide part 6. Otherwise, air is sucked in through the guide hole 39, which forms the outlet opening or the third guide channel, with transverse hole 40, in order to avoid a negative pressure, especially in the sample vessel 35.

The outside of the sample aspiration cannula 3 can be cleaned both when the sample aspiration cannula 3 is lowered, i.e. when it is inserted into the sample vessel 35 to retrieve the sample, and when the sample aspiration cannula 3 is raised, i.e. when it is pulled out of the sample vessel 35.

As soon as the sample aspiration cannula 3 has reached its upper position as shown in FIG. 2 and FIG. 3, the selector valve 11 with selector valve channel 24 is adjusted so that washing solvent for cleaning the inner surfaces contaminated with sample and the inner volume of the sample aspirating cannula 3 is pumped through conduit 15 via the dilutor syringe hollow piston 14, via the dilutor syringe 13, and conduit 12 through the injection valve 2 through the sample aspirating cannula 3. This cleans the inner surfaces and inner volume of the sample aspiration cannula 3 that are contaminated with the sample.

In accordance with the invention, the cleaning of the sample aspiration cannula 3 is very efficient, both from the inside and the outside, which considerably reduces the risk of carry-over or contamination of a sample. Sampling can also be at least partially automated, and the time required for this can be reduced.

Although the invention is represented and described in detail by means of the figures and the accompanying description, this representation and this detailed description are to be understood as illustrative and exemplary and not as restricting the invention. In order not to transfigure the invention, in certain cases well known structures and techniques may not be shown and described in detail. It is understood that professionals can make changes and modifications without departing from the scope of the claims as given below. In particular, the present invention covers further examples of execution with any combinations of features which may differ from the explicitly described combinations of features.

The present disclosure also includes embodiments with any combination of features mentioned or shown above or below for different embodiments. It also includes individual features in the figures, even if they are shown there in connection with other features and/or are not mentioned above or below. Also, the alternatives of embodiments described in the figures and the description and individual alternatives of their features may be excluded from the subject-matter of the invention or the disclosed objects. The disclosure includes embodiments which exclusively include the features described in the claims or in the examples of embodiments as well as those which include additional other features.

Further, the term "include" and/or derivatives thereof does not exclude other elements or steps. Likewise, the indefinite article "a" or "an" and derivatives thereof do not exclude a plurality. The functions of several features mentioned in the claims can be fulfilled by one unit or step. The terms "essentially", "about", "approximately" and the like in connection with a property or value also define in particular exactly the property or exactly the value. The terms "about" and "approximately" in the context of a given numerical value or range may refer to a value or range that is within 20%, within 10%, within 5% or within 2% of the given value or range. Any reference signs in the claims are not to be understood as limiting the scope of the claims. An indication that $a \approx b$ applies may be understood to mean that $|a-b|/(|a|+|b|)<0.2$, preferably $|a-b|/(|a|+|b|)<0.05$, most preferably $|a-b|/(|a|+|b|)<0.01$, where a and b may represent any variables or quantities defined and/or described at any point in this document or otherwise known to the professional.

The fact that a feature or a characteristic, for example a specific, in particular geometric, shape, is at least approximately realized, provided or present, may in particular mean that manufacturing specifications exist which provide a specification according to which the feature is made, whereby a deviation from the specification may result within the range of usual manufacturing tolerances known to the expert.

The fact that an element or feature is extended in one direction or extends in one direction may mean, in particular, that dimensions of the element or feature are greater in that direction than in others, in particular all other directions, especially orthogonal directions.

The terms "top", "bottom", "front", "rear" refer in particular to the injection unit or body in the orientation shown in FIG. 2.

The invention according to the above description can be realized in particular in the form of and/or in combination with the following embodiments:

1. Sample delivery system (A1) for liquid chromatography, in particular for LCMS and MS systems, having an injection valve unit (1) with injection valve (2), characterized in that the injection valve (2) is connected to at least one rigid sample aspiration cannula (3) and both can be directed in the direction of the sample by means of one or more drives, and in that a guide (4, 5, 6) for the sample aspiration cannula (3) is provided, which serves as a washing chamber for the sample aspiration cannula (3).

2. Sample delivery system (A1) according to embodiment 1, characterized in that the guide (4, 5, 6) designed as a washing chamber is designed in such a way that washing solvent can be pumped into it and simultaneously extracted.

3. Sample delivery system (A1) according to embodiment 1 or 2, characterized in that the guide (4, 5, 6) designed as a washing chamber is designed in such a way that it has a cup-shaped section with a larger diameter than the sample aspiration cannula (3), through which the sample aspiration cannula (3) is directed and can be subjected to washing solvent.

4. Sample delivery system (A1) according to embodiment 1, 2 or 3, characterized in that the injection valve (2) is firmly connected to a sample aspiration cannula (3) to form a rigid unit which can be moved, in particular, by means of a common drive.

5. Sample delivery system (A1) according to one of the embodiments 1 to 4, characterized in that one or more guide rods (7) of the sample aspiration cannula (3) are designed as washing solvent supply conduit and/or washing solvent suction channel.

6. Sample delivery system (A1) according to one of the embodiments 1 to 5, characterized in that a dilutor is provided which has a hollow punch (14) through which washing solvent can be switched on and pumped, in particular from behind by means of a valve (11) and pump (16, 17).

7. Sample delivery system (A1) according to one of the embodiments 1 to 6, characterized in that the sample aspiration cannula (3) is made of titanium.

8. Sample delivery system (A) according to one of the embodiments 1 to 7, characterized in that the guide (4, 5, 6) of the sample aspiration cannula (3) has a transverse hole (40) in the lower region.

9. Sample delivery system (A) according to one of the embodiments 1 to 8, characterized in that the guide (4, 5, 6) of the sample aspiration cannula (3) has a pre-puncturing extension (41) through which the sample aspiration cannula emerges.

10. Sample delivery system (A1) according to one of the preceding embodiments, characterized in that the washing chamber comprises a first cavity (33) and a second cavity (34), which are preferably connected to each other exclusively by a connecting opening (37).

11. Sample delivery system (A1) according to embodiment 10, wherein the connecting opening (37) is designed in such a way that it has a cup-shaped section with a larger diameter, preferably at least 2, 3, 5 or 10 times an outer diameter corresponding to the sample aspiration cannula (3), through which the sample aspiration cannula (3) is directed and which can be acted upon by washing solvent.

12. Sample delivery system A1) according to embodiment 10 or 11, wherein the connecting opening (37) can be at least partially closed by the sample aspiration cannula (3).

LIST OF REFERENCE SIGNS

A1. Sample delivery system
1B. Injection unit
1. Injection valve unit
2. Injection valve
3. Sample aspiration cannula
4. Guide cover
5. Middle guide part
6. Lower guide part
7. Washing solvent feed rod
8. Suction duct guide rod
9. Cannula axis
10. Washing conduit
11. Selector valve
12. Conduit
13. Dilutor syringe
14. Dilutor syringe hollow piston
15. Conduit
16. Washing solvent pump
17. Washing solvent pump
18. Bottle
19. Bottle
20. Suction conduit
21. Suction conduit
22. Connection conduit
23. Connection conduit
24. Selector valve channel
25. Dilutor drive
26. Dilutor drive adapter
27. Sample loop
28. Suction conduit
29. Waste bottle
30. Vacuum pump
31. Vacuum conduit
32. Exhaust air conduit
33. Cavity
34. Cavity
35. Sample vessel
36. Wash channel
37. Connection opening
38. Guide hole
39. Guide hole
40. Transverse hole
41. Pre-puncturing extension

The invention claimed is:

1. A sample delivery system for liquid chromatography, the sample delivery system comprising:
 a. a sample receptacle;
 b. a sample aspiration cannula for aspirating a sample located in the sample receptacle, the sample aspiration cannula being directed using a drive in a direction towards the sample receptacle so that a tip at a distal end of the sample aspiration cannula is immersed in the sample; and
 c. a guide for the sample aspiration cannula, the guide including an inlet opening for the sample aspiration cannula and an outlet opening for the sample aspiration cannula, the guide including a washing chamber, the washing chamber including a first cavity and a second cavity, the first cavity and the second cavity being connected to one another at a guide element, the guide element being provided above the sample receptacle, the guide element being configured as a washing device in an interior of the washing chamber, the guide element including a cup-shaped section having a diameter at least two times an outer diameter of the sample aspiration cannula such that the sample aspiration cannula may be guided through the cup shaped section and cleaned using a washing solvent, wherein
 the sample aspiration cannula can be retracted using the drive at least so far from the sample receptacle such that the distal end of the sample aspiration cannula may be cleaned in the washing device.

2. The sample delivery system according to claim 1 wherein the inlet opening and the outlet opening form respective guide channels for the sample aspiration cannula.

3. The sample delivery system according to claim 2, wherein at least one of the inlet opening and the outlet opening can be at least partially closed by the sample aspiration cannula.

4. The sample delivery system according to claim 2 wherein the washing chamber includes a drain for the washing solvent.

5. The sample delivery system according to claim 2 wherein the guide is movable in the direction towards the sample receptacle independently of the sample aspiration cannula.

6. The sample delivery system according to claim 2 wherein washing solvent can be pumped into the washing chamber via a supply conduit, and simultaneously sucked or pumped off via a drain.

7. The sample delivery system according to claim 1 wherein an injection unit is firmly connected to the sample aspiration cannula to form a rigid unit which can be moved using a drive.

8. The sample delivery system according to claim 7, wherein the injection unit includes an injection valve through which a sample can be aspired into and/or through the sample aspiration cannula or can be supplied to a liquid chromatograph analysis device.

9. The sample delivery system of claim 1 further comprising one or more guide rods configured as a washing solvent supply conduit and/or washing solvent suction channel.

10. The sample delivery system according to claim 1 wherein the guide has a transverse hole in the lower region, which opens into the outlet opening.

11. The sample delivery system according to claim 1 wherein the guide of the sample aspiration cannula has a penetration device through which the sample aspiration cannula emerges.

\* \* \* \* \*

UNITED STATES PATENT AND TRADEMARK OFFICE
CERTIFICATE OF CORRECTION

PATENT NO. : 11,480,551 B2
APPLICATION NO. : 16/644590
DATED : October 25, 2022
INVENTOR(S) : Werner Döbelin It is certified that error appears in the above-identified patent and that said Letters Patent is hereby corrected as shown below:

On the Title Page

(73) Assignee should read: Prolab Instruments GmbH, Reinach BL (CH)

Signed and Sealed this
Twenty-fifth Day of June, 2024

Katherine Kelly Vidal
*Director of the United States Patent and Trademark Office*